United States Patent
Zhang et al.

(10) Patent No.: US 12,342,001 B2
(45) Date of Patent: Jun. 24, 2025

(54) ENCODING METHOD, REAL-TIME COMMUNICATION METHOD, APPARATUS, DEVICE, AND STORAGE MEDIUM

(71) Applicant: TENCENT TECHNOLOGY (SHENZHEN) COMPANY LIMITED, Guangdong (CN)

(72) Inventors: Jia Zhang, Guangdong (CN); Xiaoxiang Yang, Guangdong (CN); Sijia Chen, Guangdong (CN); Jian Cao, Guangdong (CN); Yongcheng Huang, Guangdong (CN); Hongbin Cao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 91 days.

(21) Appl. No.: 18/514,741

(22) Filed: Nov. 20, 2023

(65) Prior Publication Data
US 2024/0098310 A1 Mar. 21, 2024

Related U.S. Application Data

(63) Continuation of application No. PCT/CN2022/137893, filed on Dec. 9, 2022.

(30) Foreign Application Priority Data

Jan. 27, 2022 (CN) .......................... 202210101697.6

(51) Int. Cl.
*H04N 19/87* (2014.01)
*H04N 19/124* (2014.01)
(Continued)

(52) U.S. Cl.
CPC ........... *H04N 19/87* (2014.11); *H04N 19/124* (2014.11); *H04N 19/132* (2014.11);
(Continued)

(58) Field of Classification Search
CPC ....... H04L 65/60; H04L 65/80; H04N 19/107; H04N 19/114; H04N 19/70; H04N 21/25833
See application file for complete search history.

(56) References Cited

U.S. PATENT DOCUMENTS

| | | | | |
|---|---|---|---|---|
| 6,118,817 A | * | 9/2000 | Wang | H04N 19/87 |
| | | | | 375/E7.22 |
| 6,351,493 B1 | * | 2/2002 | Reed | H04N 19/87 |
| | | | | 348/700 |

(Continued)

FOREIGN PATENT DOCUMENTS

| | | |
|---|---|---|
| CN | 107277519 A | 10/2017 |
| CN | 109413422 A | 3/2019 |
| CN | 109862359 A | 6/2019 |
| CN | 111263154 A | 6/2020 |
| CN | 112019850 A | 12/2020 |

OTHER PUBLICATIONS

International Search Report for PCT/CN2022/137893 dated Feb. 21, 2023.
Written Opinion for PCT/CN2022/137893 dated Feb. 21, 2023.

*Primary Examiner* — Fabio S Lima
(74) *Attorney, Agent, or Firm* — Sughrue Mion, PLLC

(57) ABSTRACT

An encoding method includes pre-encoding a current video frame in a video stream, to obtain a pre-encoded current video frame, when there is no I frame in M encoded video frames that have been encoded before the current video frame, determining whether the current video frame is a scene switching frame in which scene switching has occurred relative to a previous video frame, based on the pre-encoded current video frame and a pre-encoded previous video frame to the current video frame, M being a preset (Continued)

positive integer, and encoding the current video frame into an I frame when the current video frame is the scene switching frame, and encoding the current video frame into a P frame when the current video frame is not the scene switching frame.

20 Claims, 6 Drawing Sheets

(51) Int. Cl.
    *H04N 19/132*     (2014.01)
    *H04N 19/142*     (2014.01)
    *H04N 19/157*     (2014.01)
    *H04N 19/172*     (2014.01)
    *H04N 19/463*     (2014.01)

(52) U.S. Cl.
    CPC ......... *H04N 19/142* (2014.11); *H04N 19/157* (2014.11); *H04N 19/172* (2014.11); *H04N 19/463* (2014.11)

(56) References Cited

U.S. PATENT DOCUMENTS

| | | | |
|---|---|---|---|
| 11,968,376 B2* | 4/2024 | Wu | H04N 19/55 |
| 2002/0118747 A1* | 8/2002 | Liu | H04N 19/14 |
| | | | 375/E7.181 |
| 2003/0039308 A1* | 2/2003 | Wu | H04N 19/172 |
| | | | 375/E7.193 |
| 2004/0184534 A1* | 9/2004 | Wang | H04N 19/147 |
| | | | 375/E7.145 |
| 2004/0184535 A1* | 9/2004 | Wang | H04N 19/19 |
| | | | 375/E7.22 |
| 2006/0245492 A1* | 11/2006 | Pun | H04N 19/142 |
| | | | 375/E7.181 |
| 2012/0269258 A1* | 10/2012 | Yang | H04N 19/172 |
| | | | 375/E7.126 |
| 2013/0156098 A1* | 6/2013 | Schwartz | H04N 19/115 |
| | | | 375/240.03 |
| 2016/0198166 A1* | 7/2016 | Kudana | H04N 19/159 |
| | | | 375/240.15 |

* cited by examiner

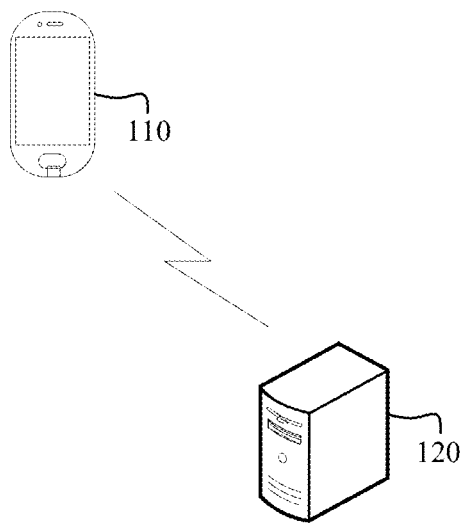

FIG. 1

```
┌─────────────────────────────────────────────────────────────────┐
│ Pre-encode a current video frame in a video stream in a pre-encoding mode, to │
│        obtain a pre-encoded frame of the current video frame           │─ S101
└─────────────────────────────────────────────────────────────────┘
                                    │
                                    ▼
┌─────────────────────────────────────────────────────────────────┐
│   Determine whether the current video frame is a scene switching frame      │
│ according to the pre-encoded frame and a target pre-encoded frame in a case │─ S102
│  that there is no I frame in M encoded frames before the current video frame│
└─────────────────────────────────────────────────────────────────┘
                                    │
                                    ▼
┌─────────────────────────────────────────────────────────────────┐
│ Encode the current video frame into an I frame in a case that the current video │
│ frame is the scene switching frame, and encode the current video frame into a P │─ S103
│   frame in a case that the current video frame is not the scene switching frame │
└─────────────────────────────────────────────────────────────────┘
```

FIG. 2

ENCODING METHOD, REAL-TIME COMMUNICATION METHOD, APPARATUS, DEVICE, AND STORAGE MEDIUM

CROSS-REFERENCE TO RELATED APPLICATIONS

This application is a continuation of International Patent Application No. PCT/CN2022/137893, filed on Dec. 9, 2022, which is based on and claims priority to Chinese patent application No. 202210101697.6, filed with the China National Intellectual Property Administration on Jan. 27, 2022, the entireties of each of which being herein incorporated by reference.

FIELD

Embodiments of this application relate to the field of Internet technologies, and in particular, to an encoding method, a real-time communication method, an apparatus, a device, and a storage medium.

BACKGROUND

A video is a consecutive image sequence, which is composed of consecutive frames, and one frame is an image. Due to the visual persistence effect of human eyes, in a case that the frame sequence is played at a specific speed, what the viewer sees is a video with consecutive actions. Due to the high similarity between the consecutive frames, in order to facilitate storage and transmission, a raw video needs to be encoded and compressed, to remove redundancy in spatial and temporal dimensions. A current video encoding standard typically includes an I frame and a P frame.

SUMMARY

According to an aspect of one or more embodiments, there is provided an encoding method, performed by a server, comprising pre-encoding a current video frame in a video stream, to obtain a pre-encoded current video frame; when there is no I frame in M encoded video frames that have been encoded before the current video frame, determining whether the current video frame is a scene switching frame in which scene switching has occurred relative to a previous video frame, based on the pre-encoded current video frame and a pre-encoded previous video frame to the current video frame, M being a preset positive integer; and encoding the current video frame into an I frame when the current video frame is the scene switching frame, and encoding the current video frame into a P frame when the current video frame is not the scene switching frame.

According to other aspects of one or more embodiments, there is also provided an apparatus and a non-transitory computer readable medium consistent with the method.

BRIEF DESCRIPTION OF THE DRAWINGS

FIG. 1 is a schematic diagram of an application scenario of an encoding method according to some embodiments.

FIG. 2 is a flowchart of an encoding method according to some embodiments.

DETAILED DESCRIPTION

Figure 3:
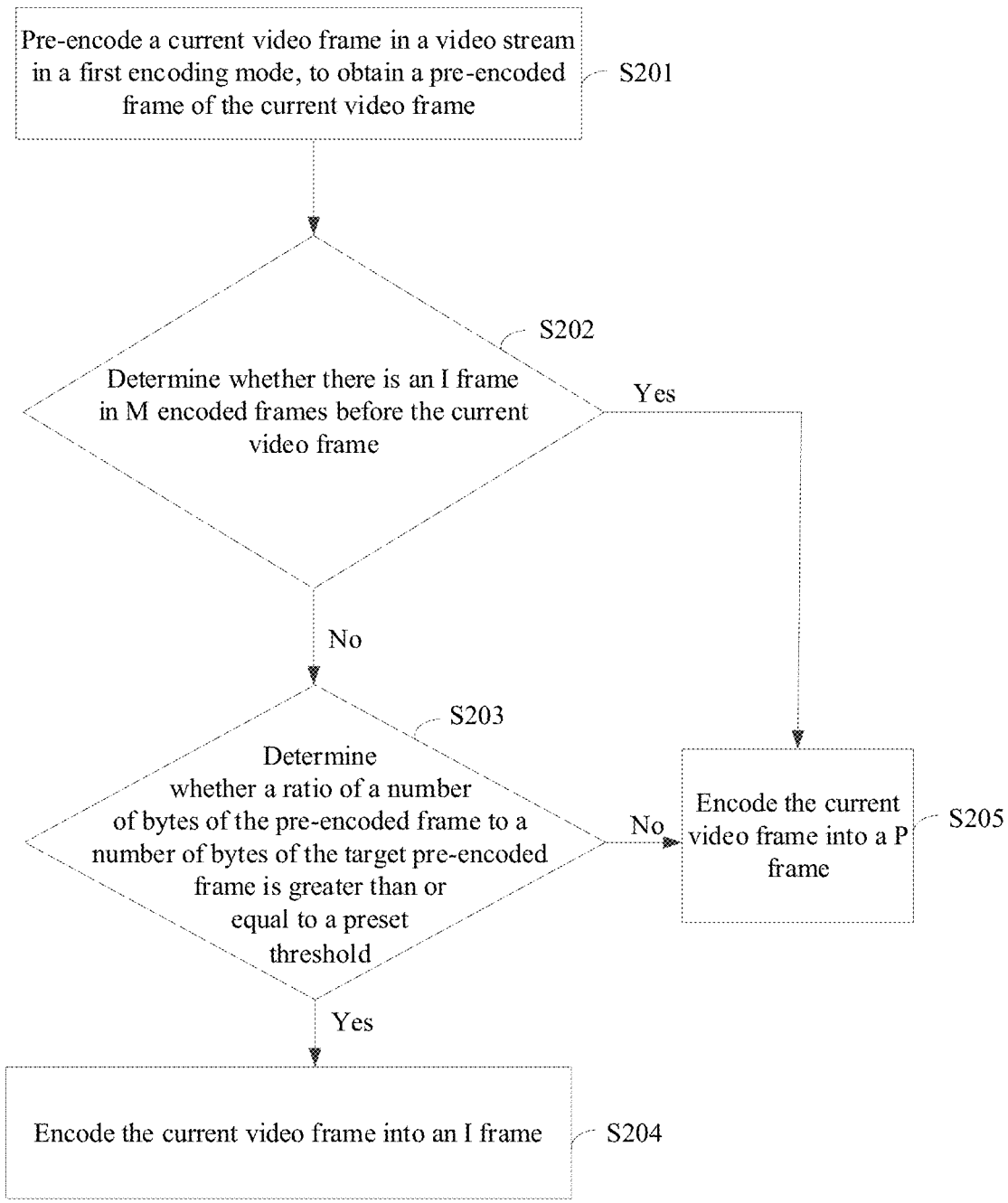
FIG. 3 is a schematic flowchart of an encoding method according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

In the present disclosure, terms such as "first" and "second" are used to distinguish similar objects, but are not necessarily used to describe a specific sequence or order. Data used in this way is exchangeable in a proper case, so that the embodiments described herein can be implemented in an order different from the order shown or described herein. Moreover, the terms "include", "contain" and any other variants mean to cover a non-exclusive inclusion. For example, a process, method, system, product, or server that includes a list of steps or units is not necessarily limited to those expressly listed steps or units, but may include other steps or units not expressly listed or inherent to such a process, method, system, product, or device.

In a current video encoding standard, an I frame is a key frame. The I frame is obtained after completely encoding a current video frame. The I frame is encoded only by using intra-frame prediction, and a decoder can independently decode content of the I frame without information of other frames. The I frame is generally used as a reference frame for subsequent frames and also as an entry point for bit stream switching. A group of encoded video image sequences generally has an I frame as a starting frame. The P frame is a forward predictive encoded frame. The P frame is obtained after encoding according to difference data between a current video frame and a previous video frame.

Since the I frame is obtained after performing complete encoding on a video frame, an encoding efficiency of the I frame is lower than an encoding efficiency of the P frame. In an related art video encoding method, the first video frame is encoded into an I frame, subsequent encoding of I frames is performed based on a fixed cycle, and a video frame after the video frame encoded into the I frame is encoded into a P frame. In other words, there are a plurality of P frames between two I frames.

However, in a case that scene switching of a video frame occurs and video encoding is still performed according to the foregoing method, there is a problem of low encoding efficiency Some embodiments provide an encoding method, which may be performed by a server, including:
  generating a pre-encoded frame of the current video frame by pre-encoding a current video frame in a video stream based on a pre-encoding mode including pre-encoding the first video frame in the video stream into an I frame, and pre-encoding a video frame after the first video frame into a P frame;
  generating a target pre-encoded frame by pre-encoding a previous video frame of the current video frame;
  generating encoded frames by encoding video frames before the current video frame;
  determining whether the current video frame is a scene switching frame based on the pre-encoded frame and the target pre-encoded frame and based on there being no I frame in M encoded frames before the current video frame, wherein the scene switching frame is a video frame in which scene switching has occurred relative to the previous video frame, M being a preset positive integer; and
  encoding the current video frame into either an I frame or a P frame based on the current video frame being the scene switching frame.

Some embodiments provide a real-time communication method, performed by a server, including:
  generating a video stream by performing video image acquisition on a video generated in real time;
  pre-encoding a current video frame in the video stream according to a pre-encoding mode, to obtain a pre-encoded frame of the current video frame, the pre-encoding mode being used for pre-encoding the first video frame in the video stream into an I frame, and pre-encoding a video frame after the first video frame into a P frame;
  determining whether the current video frame is a scene switching frame according to the pre-encoded frame and a target pre-encoded frame in a case that there is no I frame in M encoded frames before the current video frame, the scene switching frame being a video frame in which scene switching has occurred relative to a previous video frame, the target pre-encoded frame being obtained by pre-encoding the previous video frame of the current video frame, the encoded frames being obtained by encoding video frames before the current video frame, and M being a preset positive integer;
  encoding the current video frame into an I frame in a case that the current video frame is the scene switching frame, and encoding the current video frame into a P frame in a case that the current video frame is not the scene switching frame, to obtain an encoded frame of the current video frame;
  obtaining a bit stream according to the encoded frame of the current video frame and a plurality of encoded frames before the current video frame; and
  transmitting the bit stream to a client, so that the client displays a video screen according to the bit stream.
  some embodiments provide an encoding apparatus, including:
    a first encoding module, configured to pre-encode a current video frame in a video stream according to a pre-encoding mode, to obtain a pre-encoded frame of the current video frame, the pre-encoding mode being used for pre-encoding the first video frame in the video stream into an I frame, and pre-encoding a video frame after the first video frame into a P frame;
    a determining module, configured to determine whether the current video frame is a scene switching frame according to the pre-encoded frame and a target pre-encoded frame in a case that there is no I frame in M encoded frames before the current video frame, the scene switching frame being a video frame in which scene switching has occurred relative to a previous video frame, the target pre-encoded frame being obtained by pre-encoding the previous video frame of the current video frame, the encoded frames being obtained by encoding video frames before the current video frame, and M being a preset positive integer; and
    a second encoding module, configured to encode the current video frame into an I frame in a case that the current video frame is the scene switching frame, and encode the current video frame into a P frame in a case that the current video frame is not the scene switching frame.

Some embodiments provide a real-time communication apparatus, including:
  an acquisition module, configured to perform video image acquisition on a video generated in real time, to obtain a video stream;
  a first encoding module, configured to pre-encode a current video frame in the video stream according to a pre-encoding mode, to obtain a pre-encoded frame of the current video frame, the pre-encoding mode being used for pre-encoding the first video frame in the video stream into an I frame, and pre-encoding a video frame after the first video frame into a P frame;
  a determining module, configured to determine whether the current video frame is a scene switching frame according to the pre-encoded frame and a target pre-encoded frame in a case that there is no I frame in M encoded frames before the current video frame, the scene switching frame being a video frame in which scene switching has occurred relative to a previous video frame, the target pre-encoded frame being obtained by pre-encoding the previous video frame of the current video frame, the encoded frames being obtained by encoding video frames before the current video frame, and M being a preset positive integer;
  a second encoding module, configured to encode the current video frame into an I frame in a case that the current video frame is the scene switching frame, and encode the current video frame into a P frame in a case that the current video frame is not the scene switching frame, to obtain an encoded frame of the current video frame; and
  obtain a bit stream according to the encoded frame of the current video frame and a plurality of encoded frames before the current video frame; and
  a transmitting module, configured to transmit the bit stream to a client, so that the client displays a video screen according to the bit stream.

Some embodiments provide an electronic device, including: one or more processors and a memory, the memory being configured to store computer-readable instructions, and the one or more processors being configured to invoke and run the computer-readable instructions stored in the memory, to perform the method in the first aspect or implementations thereof or the second aspect or implementations thereof.

Some embodiments provide a computer-readable storage medium, configured to store a computer-readable instructions, and the computer-readable instructions causing a computer to perform the method in the first aspect or implementations thereof or the second aspect or implementations thereof.

Some embodiments provide a computer program product, including computer-readable instructions, and the computer-readable instructions causing a computer to perform the method in the first aspect or implementations thereof or the second aspect or implementations thereof.

1. Cloud technology refers to a hosting technology that unifies series of resources such as hardware, software, and network in a wide area network or a local area network, to implement computing, storage, processing, and sharing of data. The cloud technology is a generic term for a network technology, an information technology, an integration technology, a management platform technology, an application technology, and the like applied based on a cloud computing commercial mode, and can form a resource pool, which is used on demand and is flexible and convenient. The cloud computing technology is to become an important support. Backend services of a technology network system may require a huge amount of computing and storage resources, such as video websites, image websites, and more portal websites. Accompanied with the high-level development and application of the Internet industry, every item may have its own identification mark in the future, which may need to be transmitted to a backend system for logical processing. Data at different levels may be processed separately, and various types of industry data require strong system back support, which can only be implemented through cloud computing.

2. Cloud gaming is also known as gaming on demand, is an online gaming technology based on the cloud computing technology. The cloud gaming technology enables a thin client having relatively limited graphics processing and data computing abilities to run a high-quality game. In a cloud game scenario, the game is not run on a player game terminal, but run on a cloud server, and the cloud server renders game scenes into a video and audio stream and transmits the video and audio stream to the player game terminal via a network. The player game terminal does not need to have powerful graphics operation and data processing abilities, and only needs to have a basic streaming media playback ability and an ability of obtaining an input instruction of the player and transmitting the instruction to the cloud server.

3. An I frame (Intra picture) is also referred to as a key frame or an intra-frame encoded frame. The I frame is obtained after completely encoding a current video frame. The I frame is encoded only by using intra-frame prediction, and a decoder can independently decode content of the I frame without information of other frames. The I frame is generally used as a reference frame for subsequent frames and also as an entry point for bit stream switching.

4. A predictive-frame (P frame) is a forward predictive encoded frame. The P frame is obtained after encoding according to difference data between a current video frame and a previous video frame.

As described above, in an existing video encoding method, in a case that scene switching of a video frame occurs, the encoding efficiency is low. In order to solve the technical problem, in this application, during encoding of a current video frame in a video stream, primary pre-encoding and primary and secondary encoding are performed, first, the current video frame is pre-encoded according to a pre-encoding mode, to obtain a pre-encoded frame of the current video frame, and in a case that there is no I frame in first M encoded frames of the current video frame, the current video frame is encoded into an I frame upon determining of that the current video frame is a scene switching frame according to the pre-encoded frame and a target pre-encoded frame (that is, video frame scene switching occurs); and otherwise, the current video frame is encoded into a P frame, the target pre-encoded frame being obtained by pre-encoding a previous video frame of the current video frame. Therefore, an I frame is inserted in a case that video frame scene switching occurs, a P frame is encoded after the I frame is inserted, and the number of bytes occupied by the P frame is reduced, so that the encoding efficiency is improved. The encoding efficiency of an I frame is lower than the encoding efficiency of a P frame, in this application, the I frame is inserted only when it is determined that there is no I frame in the first M encoded frames of the current video frame and the video frame scene switching occurs, so that insertion of excessive I frames can be avoided and the encoding efficiency is improved.

The technical solution of this application may be applied, but is not limited, to the following scenarios:

For example, FIG. 1 is a schematic diagram of an application scenario of an encoding method according to some embodiments. As shown in FIG. 1, a terminal device 110 may perform communication with a server 120. The terminal device 110 has a streaming media playback function. The server 120 has a graphics processing function, for example, an image segmentation or image fusion function, and the server 120 also has a video and audio stream data transmission function, for example, a video encoding function.

In some implementations, the application scenario shown in FIG. 1 may further include: a base station, a core network side device, and the like. In addition, FIG. 1 illustratively provides one terminal device and one server, and may include other numbers of terminals and servers in practice, which is not limited in this application.

In some implementations, the server 120 in FIG. 1 may be an independent physical server, or a server cluster or a distributed system composed of a plurality of physical servers, or a cloud server that provides a cloud computing service. This application is not limited herein.

In a cloud game scenario, the cloud server refers to a server that runs a game in a cloud end and has functions such as video enhancement (pre-processing of encoding) and video encoding, which is not limited thereto.

The terminal device refers to a device having rich human-computer interaction modes, having an ability of accessing the Internet, typically being equipped with various operating systems, and having a strong processing ability. The terminal device may be a smart phone, a living room television, a tablet computer, an in-vehicle terminal, a player game terminal, such as a handheld game console, which is not limited thereto.

For example, in a cloud game scenario, cloud game manufacturers mainly rely on hardware encoders of hardware manufacturers to encode and transmit game content. A hardware encoder features in having an extremely fast encoding speed, but having difficulties in extracting and using intermediate encoded data. In addition, it is difficult for the cloud game manufacturers, as users, to modify a hardware encoding process, and in most cases, they can only use the abilities provided by the hardware manufacturers. The encoding method provided in this application is an adaptive I frame insertion method, which can implement insertion of an I frame in a case that video frame scene switching occurs, for example, inserting an I frame at a game scene switching moment, so that the encoding efficiency of the encoder can be improved. The encoding method provided in this application is applicable to a cloud game scenario and compatible with various hardware encoders.

The technical solution of this application is described in detail below:

FIG. 2 is a flowchart of an encoding method according to some embodiments. The method may be performed by, for example, the server 120 shown in FIG. 1, but is not limited thereto. As shown in FIG. 2, the method includes the following steps:

S101: Pre-encode a current video frame in a video stream in a pre-encoding mode, to obtain a pre-encoded frame of the current video frame.

The pre-encoding mode is used for pre-encoding the first video frame in the video stream into an I frame, and pre-encoding a video frame after the first video frame into a P frame. The pre-encoding refers to an additional primary encoding processing added before the encoding processing, and the encoding performed after the pre-encoding is secondary encoding. An amount of data of the pre-encoded frame can be obtained by pre-encoding the current video frame.

The encoding mode of the pre-encoding and the encoding mode of the secondary encoding (referring to the encoding performed in S103) are encoding modes that can enable the amount of data of the coded frame after the encoding to better reflect a matching degree of inter-frame prediction. In a case that a degree of inter-frame correlation is large, the amount of frame data after the current video frame is encoded is relatively small, and on the contrary, the amount of frame data after the current video frame is encoded is relatively large.

In some embodiments, the encoding mode of the pre-encoding and the encoding mode of the secondary encoding (referring to the encoding performed in S103) may be a constant quantization parameter (CQP) mode. By using the CQP mode for the pre-encoding and the secondary encoding, the amount of frame data after the current video frame is encoded can be relatively small in a case that the degree of inter-frame correlation is large, and on the contrary, the amount of frame data after the current video frame is encoded can be relatively large in a case that the degree of inter-frame correlation is small. The preset encoding mode may also be other encoding modes in the embodiments of this application, which is not limited in this application.

The pre-encoding is performed to obtain the amount of data of the pre-encoded frame, and in order to save the pre-encoding time, In some embodiments, the pre-encoding a current video frame according to a pre-encoding mode, to obtain a pre-encoded frame of the current video frame in S101 may include:

downsampling the current video frame according to a preset sampling size, to obtain a downsampled video frame, and pre-encoding the downsampled video frame according to the pre-encoding mode, to obtain the pre-encoded frame of the current video frame.

The sampling size may be a sampling window of a preset size, a preset sampling area, a preset sampling width, a preset sampling length, or the like. The sampling width may be, for example, ½ of the width of a raw video frame, and the sampling length may be, for example, ½ of the length of the raw video frame, that is, the width of the downsampled video frame is a ½ of the width of the current video frame, that is, the length of the downsampled video frame is a ½ of the length of the current video frame. The preset sampling width and the preset sampling length may also be other values, which is not limited in the disclosure. By performing downsampling on the current video frame to obtain a downsampled video frame, and then performing pre-encoding on the downsampled video frame, pre-encoding time can be saved, thereby improving overall encoding efficiency.

S102: Determine whether the current video frame is a scene switching frame according to the pre-encoded frame and a target pre-encoded frame in a case that there is no I frame in M encoded frames before the current video frame.

The scene switching frame is a video frame in which scene switching has occurred relative to a previous video frame, the target pre-encoded frame is obtained by pre-encoding the previous video frame of the current video frame, the encoded frame is obtained by encoding a video frame before the current video frame, and M is a preset positive integer.

The encoded frame is obtained by encoding a video frame before the current video frame, and may be specifically obtained by performing secondary encoding on the video frame before the current video frame after the pre-encoding.

M is a preset positive integer. To avoid insertion of excessive I frames, in some embodiments, the insertion of excessive I frames is avoided by presetting M. M is, for example, 128. In other embodiments, M may be another positive integer, for example, 64 or 256.

In some embodiments, the pre-encoding mode is used for pre-encoding the first video frame into an I frame and pre-encoding a video frame after the first video frame into a P frame; and therefore the pre-encoded frame of the current video frame is a P frame, the target pre-encoded frame is a pre-encoded frame of a previous video frame of the current video frame, the target pre-encoded frame is also a P frame, and whether the current video frame is the scene switching frame may be determined from two consecutive P frames. The scene switching frame is a video frame in which scene switching has occurred relative to a previous video frame. The scene switching may include: for two consecutive video frames, a scene, an image background, or other information of the video frame changes.

In an implementable manner, whether the current video frame is a scene switching frame may be determined according to an amount of data included in the pre-encoded frame and an amount of data included in the target pre-encoded frame.

In some embodiments, the amount of data included in the pre-encoded frame may be characterized by a number of bytes or another content quantization parameter. For example, whether the current video frame is a scene switching frame may be determined according to a number of bytes of the pre-encoded frame and a number of bytes of the target pre-encoded frame.

In some embodiments, the determining whether the current video frame is the scene switching frame based on the number of bytes may specifically include comparing a ratio of the numbers of bytes and a preset threshold, or comparing a difference of the numbers of bytes and a set difference, or separately comparing the numbers of bytes and a reference number of bytes.

For example, in a case that the ratio of the number of bytes of the pre-encoded frame to the number of bytes of the target pre-encoded frame is greater than or equal to a preset threshold, it is determined that the current video frame is a scene switching frame; and in a case that the ratio of the number of bytes of the pre-encoded frame to the number of bytes of the target pre-encoded frame is less than the preset threshold, it is determined that the current video frame is not the scene switching frame. In some embodiments, the preset threshold is, for example, equal to 2, or may be another value, which is not limited in the disclosure.

In general, due to the fact that inter-frame correlation of a video texture is apparently stronger than intra-frame correlation, the amount of data of an I frame is apparently greater than the amount of data of a P frame. In a CQP encoding mode, this rule is quite stable. In a case that scene switching has occurred in the current video frame, the inter-frame correlation abruptly weakens, resulting in an increase in the amount of data of the P frame. In a case that a scene different is large enough, the encoder partially abandons the inter-frame correlation and uses the intra-frame correlation to encode the current frame, resulting in generation of a large number of intra-frame encoding blocks. For two consecutive P frames, in a case that a ratio of the number of bytes of the second P frame to the number of bytes of the first P frame is greater than or equal to the preset threshold, the preset threshold being, for example, 2, that is, the number of bytes of the second P frame is greater than or equal to twice of the number of bytes of the first P frame, it is determined that the current video frame corresponding to the second P frame is a scene switching frame.

In some embodiments, by determining whether the current video frame is a scene switching frame by comparing the ratio of the number of bytes and the preset threshold, the impact of the generation of the intra-frame encoding blocks on a determining result can be effectively avoided, and the accuracy of the determining result is improved.

Further, in a case that there is an I frame in the M encoded frames before the current video frame, the current video frame is encoded into a P frame, or the current video frame is encoded according to a secondary encoding mode and a preset encoding mode.

In some embodiments of this application, in an implementable implementation, the secondary encoding mode may include: starting from the first video frame, performing encoding of the I frame according to a preset cycle, and encoding a video frame following the video frame that is encoded into the I frame into the P frame. For example, the preset cycle is 200 frames, that is, the first video frame is encoded into an I frame, the $201^{st}$ video frame is encoded into an I frame, the $401^{st}$ video frame is encoded into an I frame, . . . , and video frames after each video frame that is encoded into an I frame are encoded into P frames, and the encoded frames between two I frames are P frames.

In some embodiments, the implementation of foregoing secondary encoding mode is an implementable mode.

The preset encoding mode may be a CQP mode. By using the CQP mode for the pre-encoding and the secondary encoding, the amount of frame data after the current video frame is encoded can be relatively small in a case that the degree of inter-frame correlation is large, and the amount of frame data after the current video frame is encoded can be relatively large in a case that the degree of inter-frame correlation is small.

Specifically, in some embodiments, in a case that there is an I frame in the M encoded frames before the current video frame, in the implementation of performing the secondary encoding on the current video frame according to the secondary encoding mode and the preset encoding mode, pre-encoding is first performed on the current video frame to obtain a pre-encoded frame of the current video frame before performing the secondary encoding on the current video frame according to the secondary encoding mode and the preset encoding mode, then whether there is an I frame in the M encoded frames before the current video frame is determined, and in a case that there is no I frame, an I frame can be inserted (that is, encoded). Upon determining of that there is an I frame in the M encoded frames before the current video frame, the secondary encoding is performed on the current video frame according to the secondary encoding mode and the preset encoding mode. For example, in a case that the secondary encoding mode is the foregoing implementable periodic encoding mode (that is, the I frame and the P frame are encoded according to a fixed cycle), the current video frame is encoded into a P frame.

In some embodiments, by determining whether to encode the current video frame into an I frame by determining whether there is an I frame in the M encoded frames before the current video frame, an I frame can be ensured to be obtained through encoding during scene switching, and the I frame is ensured not to be lost during video playback, thereby improving the video quality. In addition, the impact on the encoding efficiency caused by the insertion of excessive I frames during encoding can be avoided.

In some embodiments, before determining that there is no I frame in the M encoded frames before the current video frame, the method may also include:

counting a number of encoded frames before the current video frame, and in a case that the number of encoded frames before the current video frame reaches M, determining whether there is no I frame in the M encoded frames before the current video frame.

S103: Encode the current video frame into an I frame in a case that the current video frame is the scene switching frame, and encode the current video frame into a P frame in a case that the current video frame is not the scene switching frame.

In some embodiments, an I frame is inserted at a scene switching position, so that the encoding efficiency of the encoder can be improved and in addition, the fluency of video screens in a playback process can be ensured. For example, in a cloud game, a cloud game service can be provided in a manner in which bandwidth is reduced for the same picture quality and occurrence of lagging of a game picture can be avoided, thereby improving the fluency of the game picture.

In the encoding method provided in this application, first, the current video frame in the video stream is pre-encoded according to a pre-encoding mode, to obtain a pre-encoded frame of the current video frame, and in a case that there is no I frame in first M encoded frames of the current video frame, the current video frame is encoded into an I frame upon determining of that the current video frame is a scene switching frame according to the pre-encoded frame and a target pre-encoded frame (that is, video frame scene switching occurs); and otherwise, the current video frame is encoded into a P frame, the target pre-encoded frame being obtained by pre-encoding a previous video frame of the current video frame. Therefore, an I frame is inserted in a case that video frame scene switching occurs, a P frame is encoded after the I frame is inserted, and the number of bytes occupied by the P frame is reduced, so that the encoding efficiency is improved. The encoding efficiency of an I frame is lower than the encoding efficiency of a P frame, in this application, the I frame is inserted only when it is determined that there is no I frame in the first M encoded frames of the current video frame and the video frame scene switching occurs, so that insertion of excessive I frames can be avoided and the encoding efficiency is improved.

The technical solution of the encoding method provided in this application is described in detail below with reference to a specific embodiment.

FIG. 3 is a schematic flowchart of an encoding method according to some embodiments. As shown in FIG. 3, the method of may include the following steps:

S201: Pre-encode a current video frame in a video stream in a pre-encoding mode, to obtain a pre-encoded frame of the current video frame.

The pre-encoding mode is used for pre-encoding the first video frame in the video stream into an I frame, and pre-encoding a video frame after the first video frame into a P frame.

Figure 4:
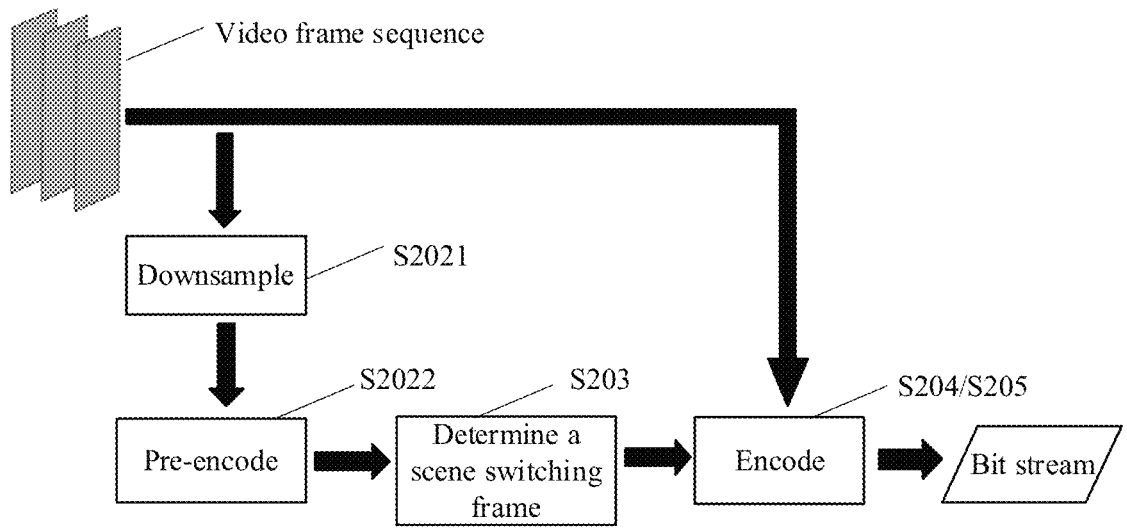
FIG. 4 is a block flowchart of an encoding method according to some embodiments.

FIG. 4 is a flowchart of an encoding method provided for this application embodiment, combined with FIG. 4, the current video frame is any video frame in the video frame sequence, specifically, S201 may include the following steps:

S2011: Downsample the current video frame according to the preset sampling size, to obtain a downsampled video frame.

The sampling size may be a sampling window of a preset size, a preset sampling area, a preset sampling width, a preset sampling length, or the like. The sampling width may be, for example, ½ of the width of a raw video frame, and the sampling length may be, for example, ½ of the length of the raw video frame, that is, the width of the downsampled video frame is a ½ of the width of the current video frame, that is, the length of the downsampled video frame is a ½ of the length of the current video frame. The preset sampling width and the preset sampling length may also be other values, which is not limited in the disclosure.

S2012: Pre-encode the downsampled video frame according to the pre-encoding mode, to obtain a pre-encoded frame of the current video frame.

By performing downsampling on the current video frame to obtain a downsampled video frame, and then performing pre-encoding on the downsampled video frame, pre-encoding time can be saved, thereby improving overall encoding efficiency.

S202: Determine whether there is an I frame in M encoded frames before the current video frame, M being a preset positive integer.

Specifically, a number of encoded frames before the current video frame is counted, and whether there is an I frame in M encoded frames before the current video frame is determined in a case that the number of encoded frames before the current video frame reaches M.

In a case that there is an I frame in M encoded frames before the current video frame, S205 is performed, to encode the current video frame into a P frame. In a case that there is no I frame in M encoded frames before the current video frame, S203 is performed. In some embodiments, for example, M is equal to 128. In other embodiments, M may be another positive integer, for example, 64 or 256.

In some embodiments, the encoding mode of the pre-encoding and the encoding mode of the secondary encoding (referring to the encoding performed in S204 or S205) may be, for example, a CQP mode. By using the CQP mode for the encoding, the amount of frame data after the current video frame is encoded can be relatively small in a case that the degree of inter-frame correlation is large, and on the contrary, the amount of frame data after the current video frame is encoded can be relatively large.

S203: Determine a scene switching frame by determining whether a ratio of a number of bytes of the pre-encoded frame to a number of bytes of the target pre-encoded frame is greater than or equal to a preset threshold.

The target pre-encoded frame is obtained by pre-encoding a previous video frame of the current video frame. In a case that the ratio is greater than or equal to the preset threshold, it is determined that the current video frame is the scene switching frame, and S204 is performed; and in a case that the ratio is greater than or equal to the preset threshold, it is determined that the current video frame is not the scene switching frame, and S205 is performed. The preset threshold is, for example, 2.

S204: Encode the current video frame into an I frame.

S205: Encode the current video frame into a P frame.

After the current video frame is encoded through S204 or S205, an encoded bit stream is obtained.

In the encoding method provided in some embodiments, the pre-encoding and the secondary encoding are performed, the encoded frame of the pre-encoding is used for determining whether the scene switching occurs, and upon determining of that there is no I frame in the first M encoded frames of the current video frame and the scene switching occurs, the current video frame is encoded into an I frame; and otherwise, the current video frame is encoded into a P frame. Therefore, an I frame is inserted in a case that video frame scene switching occurs, a P frame is encoded after the I frame is inserted, and the number of bytes occupied by the P frame is reduced, so that the encoding efficiency is improved. The encoding efficiency of an I frame is lower than the encoding efficiency of a P frame, in this application, the I frame is inserted only when it is determined that there is no I frame in the first M encoded frames of the current video frame and the video frame scene switching occurs, so that insertion of excessive I frames can be avoided and the encoding efficiency is improved.

Figure 5:
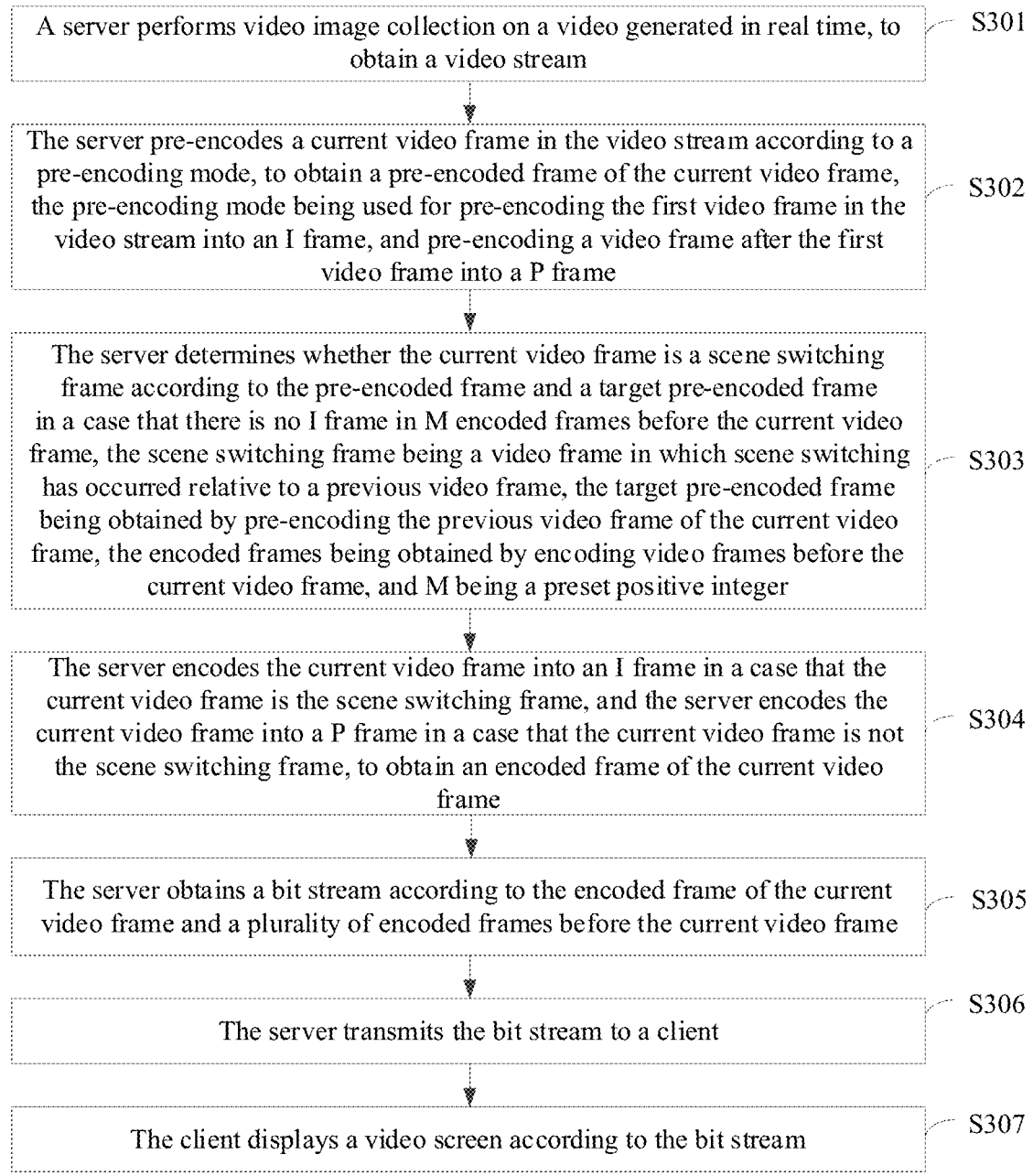
FIG. 5 is a flowchart of a real-time communication method according to some embodiments.

FIG. 5 is a flowchart of a real-time communication method according to some embodiments. As shown in FIG. 5, the method may include the following steps:

S301: A server performs video image collection on a video generated in real time, to obtain a video stream.

Among a plurality of video frames included in the video stream, each video frame includes an image composed of a virtual game picture.

S302: The server pre-encodes a current video frame in the video stream according to a pre-encoding mode, to obtain a pre-encoded frame of the current video frame, the pre-encoding mode being used for pre-encoding the first video frame in the video stream into an I frame, and pre-encoding a video frame after the first video frame into a P frame.

S303: The server determines whether the current video frame is a scene switching frame according to the pre-encoded frame and a target pre-encoded frame in a case that there is no I frame in M encoded frames before the current video frame, the scene switching frame being a video frame in which scene switching has occurred relative to a previous video frame, the target pre-encoded frame being obtained by pre-encoding the previous video frame of the current video frame, the encoded frames being obtained by encoding video frames before the current video frame, and M being a preset positive integer.

S304: The server encodes the current video frame into an I frame in a case that the current video frame is the scene switching frame, and the server encodes the current video frame into a P frame in a case that the current video frame is not the scene switching frame, to obtain an encoded frame of the current video frame.

In some embodiments, for a specific implementation of the encoding of the current video frame by the server, reference may be made to the description in the embodiment shown in FIG. 2, and details are not described herein again.

S305: The server obtains a bit stream according to the encoded frame of the current video frame and a plurality of encoded frames before the current video frame.

S306: The server transmits the bit stream to a client.

S307: The client displays a video screen according to the bit stream.

In the real-time communication method provided in some embodiments, first, the server pre-encodes the current video frame in the video stream according to a pre-encoding mode, to obtain a pre-encoded frame of the current video frame, and in a case that there is no I frame in first M encoded frames of the current video frame, encodes the current video frame into an I frame upon determining of that the current video frame is a scene switching frame according to the pre-encoded frame and a target pre-encoded frame (that is, video frame scene switching occurs); and otherwise, encodes the current video frame into a P frame, the target pre-encoded frame being obtained by pre-encoding a previous video frame of the current video frame. Therefore, an I frame is inserted in a case that video frame scene switching occurs, a P frame is encoded after the I frame is inserted, and the number of bytes occupied by the P frame is reduced, so that the encoding efficiency is improved. The encoding efficiency of an I frame is lower than the encoding efficiency of a P frame, in this application, the I frame is inserted only when it is determined that there is no I frame in the first M encoded frames of the current video frame and the video frame scene switching occurs, so that insertion of excessive I frames can be avoided and the encoding efficiency is improved.

In a cloud game scenario, the foregoing image encoding method has practical significance only when a decoding end, that is, the foregoing terminal device, has a decoding ability for the encoded bit stream. The following provides a method for obtaining an optimal decoding configuration.

Figure 6:
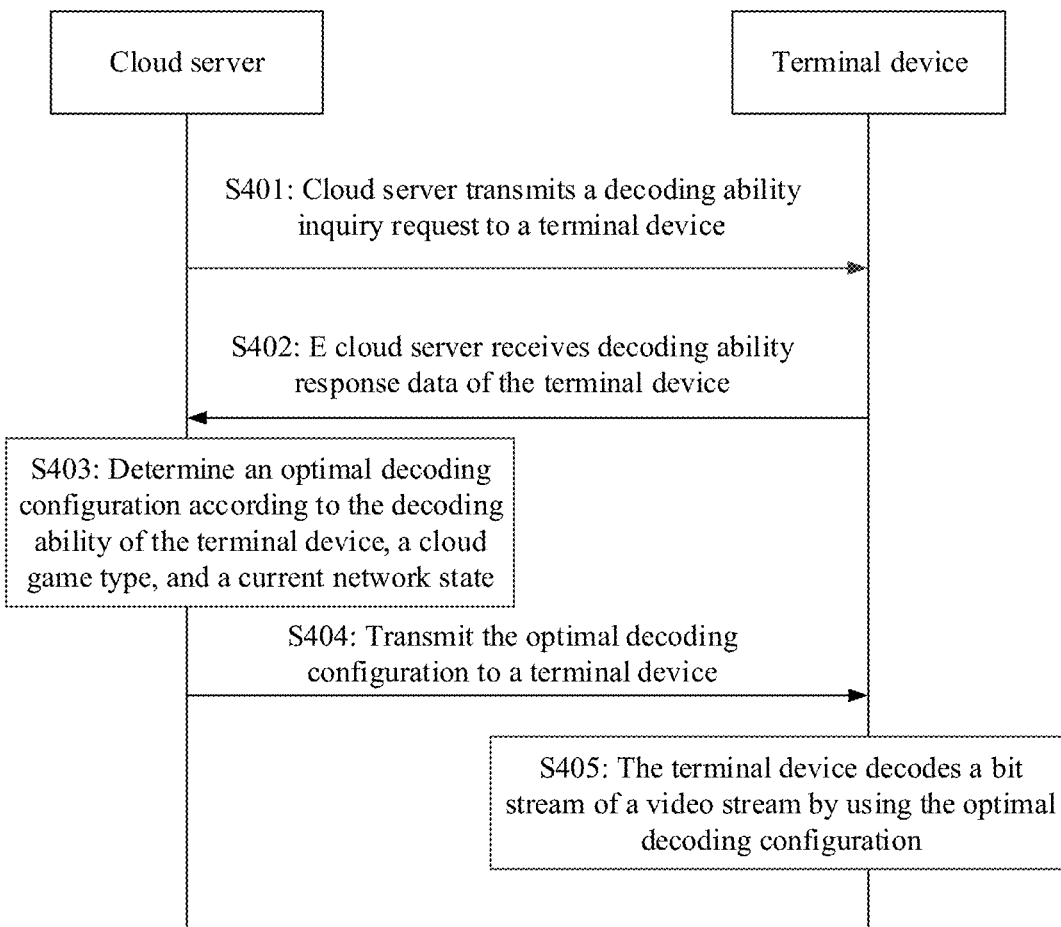
FIG. 6 is a flowchart of a method for obtaining an optimal decoding configuration according to some embodiments.

FIG. 6 is a flowchart of a method for obtaining an optimal decoding configuration according to some embodiments. As shown in FIG. 6, the method includes the following steps:

S401: A cloud server transmits a decoding ability inquiry request to a terminal device.

S402: The cloud server receives decoding ability response data of the terminal device, the decoding ability response data including a decoding ability of the terminal device.

S403: The cloud server determines an optimal decoding configuration according to the decoding ability of the terminal device, a cloud game type, and a current network state.

S404: The cloud server transmits the optimal decoding configuration to a terminal device.

S405: The terminal device decodes a bit stream of a video stream by using the optimal decoding configuration.

Figure 7:
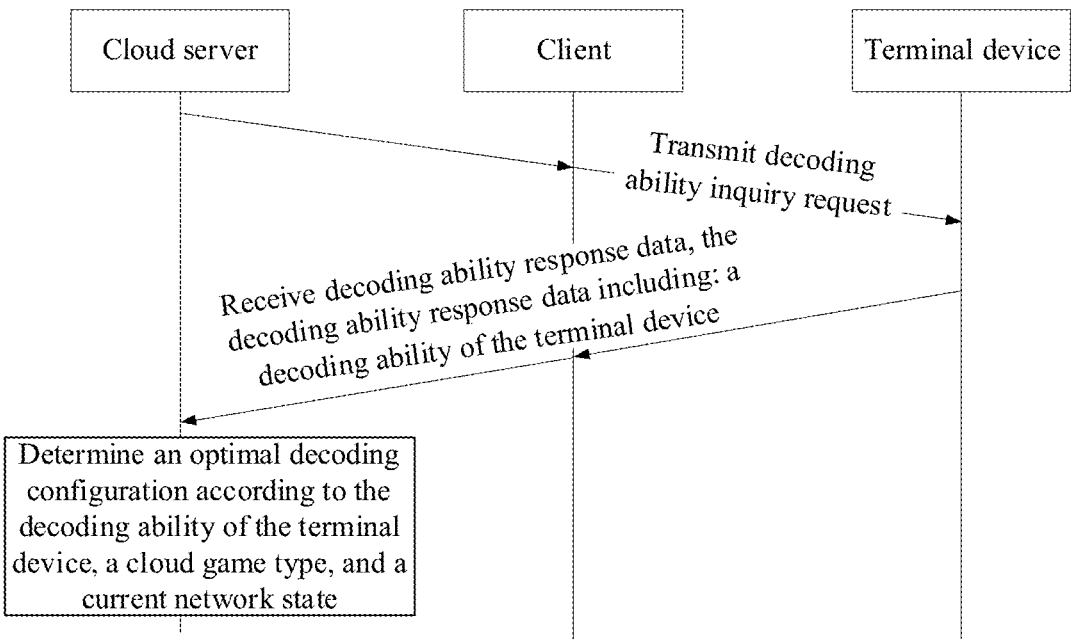
FIG. 7 is a flowchart of a method for obtaining an optimal decoding configuration according to some embodiments.

In some embodiments, FIG. 7 is a flowchart of a method for obtaining an optimal decoding configuration according to some embodiments. As shown in FIG. 7, the cloud server may transmit a decoding ability request to the terminal device by using a client installed in the terminal device, and the terminal device may also return a decoding ability response to the cloud server by using the client. In a cloud game scenario, the client may be a cloud game client.

In some embodiments, the decoding ability inquiry request is used for requesting to obtain feedback data indicating a decoding ability of the terminal device.

In some embodiments, the decoding ability request includes, but is not limited to, at least one of the following: a protocol version number and a specific decoding protocol query.

In some embodiments, the protocol version number refers to a lowest protocol version supported by the cloud server, and the protocol may be a decoding protocol.

In some embodiments, the specific decoding protocol query refers to a decoding protocol to be queried by the cloud server, for example, a video decoding protocol H264 or H265.

Exemplarily, code of the decoding ability request may be implemented in the following:

[codec_ability]; codec ability
version=1.0; lowest protocol version supported by the cloud server
type=16, 17; H264, H265 query ability For the explanation of each data structure in the code, reference may be made to Table 1 below, which is not repeated in this application.

The data structure of the decoding ability of the terminal device may be shown in Table 1:

TABLE 1

| Data structure of decoding ability of terminal device | | |
|---|---|---|
| Section | Type | Section description |
| [codec_ability] | — | Video codec ability |
| [codecN] | — | Video codec, N is a value 1, 2, 3, . . . |
| Key | Type | Value description |
| codecs | integral type | Required. The number of hardware codec types supported by the device. In a case that the number of hardware codec types is N, N sections are followed, respectively, [codec1], [codec2], . . . , [codecN], for identifying specific information of the N codec types. |
| type | enumerated type | Encoding protocol type 0: undefined; 16: H264; 17: H265; |
| profiles | integral type | The number of profiles supported by the decoder. In a case that the number of profiles supported by the decoder is N, N keys are followed, respectively, profile1, profile2, . . . , profileN, for identifying specific content of the N profiles. |

TABLE 1-continued

Data structure of decoding ability of terminal device

| | | |
|---|---|---|
| profileN | string (two-tuple) | N is a value 1, 2, 3, . . . which indicates the two-tuple (profile,level) supported by the decoder. The first element is profile and the second element is level, separated by a comma. In a case that only the H264 decoding protocol of a terminal device supports profile = High and level = Level51, profileN = 8.32768 |
| performances | integral type | The number of performance indicators for the decoder. In a case that the number of performance indicators of the decoder is N, N keys are followed, respectively, performance1, performance2, . . . , performanceN, for identifying specific content of the performance. |
| performanceN | string (triple) | N is a value 1, 2, 3, . . . .. which indicates a performance data triplet supported by the terminal device. The first element is a video size, the second element is a video frame rate, and the third element is a single-frame decoding delay, in milliseconds. In a case that the terminal device can decode 1080 p@60 fps to 5 ms, performanceX = 8, 8, 5. |

Definitions of the decoding protocols are shown in Table 2:

TABLE 2

Decoding protocols

| Decoding protocol | Enumerated definition |
|---|---|
| H264 | 16 |
| H265 | 17 |
| AV1 | 48 |

Definitions of the profiles supported by the terminal device under the decoding protocols are shown in Table 3:

TABLE 3

Definitions of profiles supported under decoding protocols

| Decoding protocol | Profile | Enumerated definition |
|---|---|---|
| H264 | Baseline | 0x01 |
| | Main | 0x02 |
| | Extended | 0x04 |
| | High | 0x08 |
| | High10 | 0x10 |
| | High422 | 0x20 |
| | High444 | 0x40 |
| | ConstrainedBaseline | 0x10000 |
| | ConstrainedHigh | 0x80000 |
| H265 | Main | 0x01 |
| | Main10 | 0x02 |
| | MainStill | 0x04 |
| | Main10HDR10 | 0x1000 |
| | Main10HDR10Plus | 0x2000 |
| AV1 | Main8 | 0x1 |
| | Main10 | 0x2 |
| | Main10HDR10 | 0x1000 |
| | Main10HDR10Plus | 0x2000 |

Definitions of levels supported by the terminal device under the decoding protocols are shown in Table 4.

TABLE 4

Definitions of levels supported under decoding protocols

| Decoding protocol | Level | Enumerated definition |
|---|---|---|
| H264 | Level1 | 0x01 |
| | Level1b | 0x02 |
| | Level11 | 0x04 |
| | Level12 | 0x08 |
| | Level13 | 0x10 |
| | Level2 | 0x20 |
| | Level21 | 0x40 |
| | Level22 | 0x80 |
| | Level3 | 0x100 |
| | Level31 | 0x200 |
| | Level32 | 0x400 |
| | Level4 | 0x800 |
| | Level41 | 0x1000 |
| | Level42 | 0x2000 |
| | Level5 | 0x4000 |
| | Level51 | 0x8000 |
| | Level52 | 0x10000 |
| | Level6 | 0x20000 |
| | Level61 | 0x40000 |
| | Level62 | 0x80000 |
| H265 | MainTierLevel1 | 0x1 |
| | HighTierLevel1 | 0x2 |
| | MainTierLevel2 | 0x4 |
| | HighTierLevel2 | 0x8 |
| | MainTierLevel21 | 0x10 |
| | HighTierLevel21 | 0x20 |
| | MainTierLevel3 | 0x40 |
| | HighTierLevel3 | 0x80 |
| | MainTierLevel31 | 0x100 |
| | HighTierLevel31 | 0x200 |
| | MainTierLevel4 | 0x400 |
| | HighTierLevel4 | 0x800 |
| | MainTierLevel41 | 0x1000 |
| | HighTierLevel41 | 0x2000 |
| | MainTierLevel5 | 0x4000 |
| | HighTierLevel5 | 0x8000 |
| | MainTierLevel51 | 0x10000 |
| | HighTierLevel51 | 0x20000 |
| | MainTierLevel52 | 0x40000 |
| | HighTierLevel52 | 0x80000 |
| | MainTierLevel6 | 0x100000 |
| | HighTierLevel6 | 0x200000 |
| | MainTierLevel61 | 0x400000 |
| | HighTierLevel61 | 0x800000 |
| | MainTierLevel62 | 0x1000000 |
| | HighTierLevel62 | 0x2000000 |
| AV1 | Level2 | 0x1 |
| | Level21 | 0x2 |
| | Level22 | 0x4 |
| | Level23 | 0x8 |
| | Level3 | 0x10 |
| | Level31 | 0x20 |
| | Level32 | 0x40 |
| | Level33 | 0x80 |
| | Level4 | 0x100 |

TABLE 4-continued

Definitions of levels supported under decoding protocols

| Decoding protocol | Level | Enumerated definition |
|---|---|---|
| | Level41 | 0x200 |
| | Level42 | 0x400 |
| | Level43 | 0x800 |
| | Level5 | 0x1000 |
| | Level51 | 0x2000 |
| | Level52 | 0x4000 |
| | Level53 | 0x8000 |
| | Level6 | 0x10000 |
| | Level61 | 0x20000 |
| | Level62 | 0x40000 |
| | Level63 | 0x80000 |
| | Level7 | 0x100000 |
| | Level71 | 0x200000 |
| | Level72 | 0x400000 |
| | Level73 | 0x800000 |

The profile and the level supported by the terminal device are listed in two-tuples, for example, a device A supports an H264 ability: (Baseline,Level51), (Main,Level51), and (High,Level51).

In some embodiments, in addition to the decoding ability of the terminal device, the decoding ability response may further include: an identifier indicating whether a query of a decoding protocol to be queried by the cloud server is successful, and a protocol version number supported by the terminal device.

In some embodiments, in a case that the query of the decoding protocol to be queried by the cloud server is successful, an identifier indicating whether a query of the decoding protocol to be queried by the cloud server is successful may be represented by 0; in a case that the query of the decoding protocol to be queried by the cloud server fails, an identifier indicating whether the query of the decoding protocol to be queried by the cloud server is successful may be represented by an error code, for example, 001.

In some embodiments, the protocol version number refers to a lowest protocol version supported by the terminal device, and the protocol may be a decoding protocol.

In some embodiments, the decoding ability of the terminal device includes, but is not limited to, at least one of the following: a decoding protocol type supported by the terminal device, a profile, a level, and a performance supported by the decoding protocol, or the like.

Example 1: code of the decoding ability response may be implemented in the following:

```
[codec_ability]; codec ability
    state = 0; the query is successful and state code 0 is returned
    version = 1.0; the protocol version of the terminal device
    codecs = 2; 2 hardware codecs are supported, and the specific information is in
the subsequent [codec1] and [codec2]
    [codec1]; information of the first decoder
        type = 16; the codec is H264
        profiles = 3; the H264 supports 3 profiles, and the specific information is in the
subsequent profile1-profile3
            profile1 = 1,32768; the H264 supports (Baseline, Level51), profile2 = 2,32768; the
H264 supports (Main,Level51),
            profile3 = 8,32768; the H264 supports (High,Level51)
        performances = 3; the H264 supports 3 performances, and the information is in
performance1-performance3
            performance1 = 4,8,3; the H264 decodes at 720p@60fps for 3ms,
            performance2 = 8,8,6; the H264 decodes at 1080p@60fps for 6ms,
            performance3 = 8,32,4; the H264 decodes at 1080p@120fps for 4ms
    [codec2]; information of the second decoder
        type = 17; the codec is H265
        profiles = 1; the H265 supports 1 profile, and the specific information is in the
subsequent profile 1
            profile1 = 1,65536; the H265 supports (Main, MainTierLevel51)
        performances = 3; the H265 supports 3 performances, and the information is in
performance1-performance3
            performance1 = 4,8,4; the H264 decodes at 720p@60fps for 4ms,
            performance2 = 8,8,8; the H264 decodes at 1080p@60fps for 8ms,
            performance3 = 8,32,6; the H264 decodes at 1080p@120fps for 6ms
```

For the explanation of each data structure in the code, reference may be made to Table 1 below, which is not repeated in this application.

Example 2: in a case that the terminal device only supports partial decoding protocol, the supported decoding protocol information is returned, and code of the decoding ability response in this case may be implemented in the following:

```
[codec_ability]; codec ability
    state = 0; the query is successful and state code 0 is returned
    version = 1.0; the protocol version of the terminal device
    codecs = 1; 1 hardware codec is supported, and the specific information is in
the subsequent [codec1]
    [codec1]; information of the first decoder
        type = 16; the codec is H264, enumerated type profiles = 3; the H264 supports 3
profiles, and the specific information is in the subsequent profile1-profile3
```

```
profile1 = 1,32768; the H264 supports (Baseline, Level51)
profile2 = 2,32768; the H264 supports (Main, Level51)
profile3 = 8,32768; the H264 supports (High, Level51) performances = 3; the
H264 supports 3 performances, and the information is in performance1-performance3
performance1 = 4,8,3; the H264 decodes at 720p@60fps for 3ms,
performance2 = 8,8,6; the H264 decodes at 1080p@60fps for 6ms,
performance3 = 8,32,4; the H264 decodes at 1080p@120fps for 4ms
```

For the explanation of each data structure in the code, reference may be made to Table 1 below, which is not repeated in this application.

Example 3: in a case that the terminal device does not support the decoding protocol, codecs=0 is returned, and code of the decoding ability response is in this case may be implemented in the following:

```
[codec_ability]; codec ability
    state = 0; the query is successful and state code 0 is returned
    version = 1.0; the protocol version of the terminal device
    codecs = 0; supporting 0 hardware codec
```

For the explanation of each data structure in the code, reference may be made to Table 1 below, which is not repeated in this application.

Example 4: in a case that the decoding ability request for the terminal device fails, a specific error code is returned, and code of the decoding ability response in this case may be implemented in the following:

```
[codec_ability]; codec ability
    state =-1; the query fails and state code -1 is returned
    version = 0.9; the protocol version of the terminal device
```

For the explanation of each data structure in the code, reference may be made to Table 1 below, which is not repeated in this application.

In some embodiments, for a more complex cloud game type, the cloud server selects a higher ability within a decoding ability range of the terminal device, for example, in the foregoing example 1, selecting a profile3 and a performance3. The cloud server may select an optimal decoding configuration according to a mapping relationship between the cloud game type and the decoding ability of the terminal device, or may select an optimal decoding configuration according to another selection rule.

In some embodiments, for a worse network state, the cloud server may select a higher ability within a decoding ability range of the terminal device, for example, in the foregoing example 1, selecting a profile3 and a performance3. The cloud server may select an optimal decoding configuration according to a mapping relationship between the network state and the decoding ability of the terminal device, or may select an optimal decoding configuration according to another selection rule.

In some embodiments, the cloud server may select an optimal decoding configuration according to a mapping relationship between the cloud game type, the network state, and the decoding ability of the terminal device, or may select an optimal decoding configuration according to another selection rule.

In conclusion, how to determine an optimal decoding configuration is not limited in this application.

To sum up, through the technical solution provided in the disclosure, the terminal device decodes the bit stream of the video stream by using the optimal decoding configuration, so that the decoding effect is improved.

Figure 8:
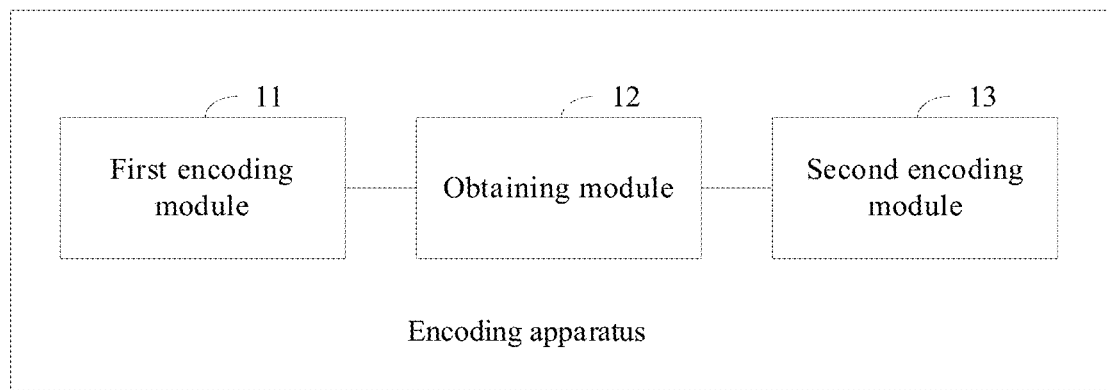
FIG. 8 is a schematic structural diagram of an encoding apparatus according to some embodiments.

FIG. 8 is a schematic structural diagram of an encoding apparatus according to some embodiments. As shown in FIG. 8, the encoding apparatus may include: a first encoding module 11, a determining module 12, and a second encoding module 13.

The first encoding module 11 is configured to pre-encode a current video frame in a video stream according to a pre-encoding mode, to obtain a pre-encoded frame of the current video frame, the pre-encoding mode being used for pre-encoding the first video frame in the video stream into an I frame, and pre-encoding a video frame after the first video frame into a P frame;

the determining module 12 is configured to determine whether the current video frame is a scene switching frame according to the pre-encoded frame and a target pre-encoded frame in a case that there is no I frame in M encoded frames before the current video frame, the scene switching frame being a video frame in which scene switching has occurred relative to a previous video frame, the target pre-encoded frame being obtained by pre-encoding the previous video frame of the current video frame, the encoded frames being obtained by encoding video frames before the current video frame, and M being a preset positive integer; and the second encoding module 13 is configured to encode the current video frame into an I frame in a case that the current video frame is the scene switching frame, and encode the current video frame into a P frame in a case that the current video frame is not the scene switching frame.

In some embodiments, the first encoding module 11 is further configured to: in a case that there is an I frame in the M encoded frames before the current video frame, the current video frame is encoded into a P frame, or the current video frame is encoded according to a secondary encoding mode and a preset encoding mode.

In some embodiments, the first encoding module 11 is configured to: perform downsampling on the current video frame according to a preset sampling width and a preset sampling length, to obtain a downsampled video frame; and pre-encoding the downsampled video frame according to the pre-encoding mode, to obtain the pre-encoded frame of the current video frame.

In some embodiments, the determining module 12 is further configured to: count a number of encoded frames before the current video frame, and in a case that the number of encoded frames before the current video frame reaches M, determine whether there is no I frame in the M encoded frames before the current video frame.

In some embodiments, M may be 128.

In some embodiments, the determining module 12 is configured to determine whether the current video frame is a scene switching frame according to a size of the pre-encoded frame and a size of the target pre-encoded frame.

In some embodiments, the determining module 12 is configured to determine whether the current video frame is a scene switching frame according to a number of bytes of the pre-encoded frame and a number of bytes of the target pre-encoded frame.

In some embodiments, the determining module 12 is specifically configured to: determine that the current video frame is the scene switching frame in a case that a ratio of the number of bytes of the pre-encoded frame to the number of bytes of the target pre-encoded frame is greater than or equal to a preset threshold; and determine that the current video frame is not the scene switching frame in a case that the ratio of the number of bytes of the pre-encoded frame to the number of bytes of the target pre-encoded frame is less than the preset threshold.

In some embodiments, the preset encoding mode is a constant quantization parameter (CQP) mode, and the encoding mode of the pre-encoding is the CQP mode.

In some embodiments, the secondary encoding mode includes: starting from the first video frame, performing encoding of the I frame according to a preset cycle, and encoding a video frame following the video frame that is encoded into the I frame into the P frame.

The apparatus embodiments and the method embodiments may correspond to each other, and for similar descriptions, reference may be made to the method embodiments, which are not repeated herein in order to avoid repetition. Specifically, the encoding apparatus shown in FIG. 8 may perform the method embodiment corresponding to FIG. 2, and the foregoing and other operations and/or functions of the modules in the encoding apparatus are separately intended to implement corresponding processes in the method embodiment corresponding to FIG. 2, which are not repeated herein for conciseness.

Figure 9:
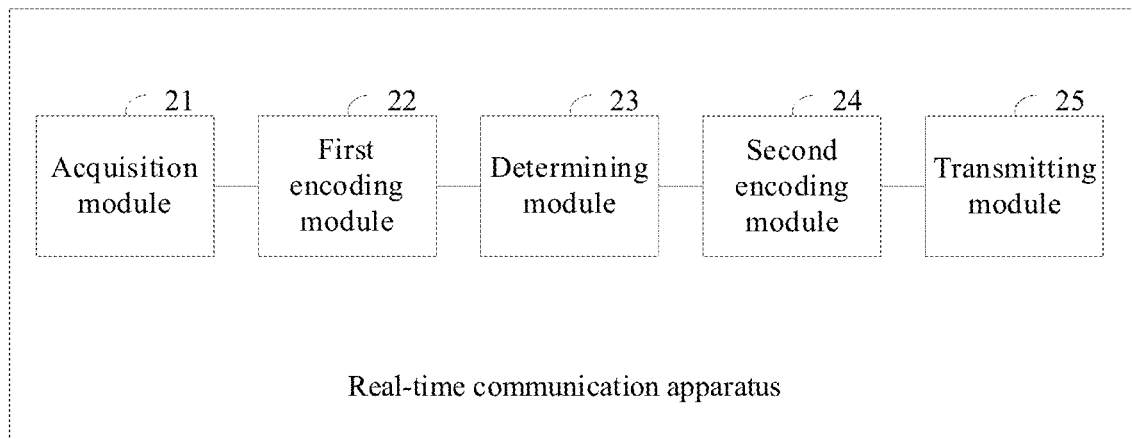
FIG. 9 is a schematic structural diagram of a real-time communication apparatus according to some embodiments.

FIG. 9 is a schematic structural diagram of a real-time communication apparatus according to some embodiments. As shown in FIG. 9, the real-time communication apparatus may include: an acquisition module 21, a first encoding module 22, a determining module 23, a second encoding module 24, and a transmitting module 25.

The acquisition module 21 is configured to perform video image acquisition on a video generated in real time, to obtain a video stream;
  the first encoding module 22 is configured to pre-encode a current video frame in the video stream according to a pre-encoding mode, to obtain a pre-encoded frame of the current video frame, the pre-encoding mode being used for pre-encoding the first video frame in the video stream into an I frame, and pre-encoding a video frame after the first video frame into a P frame;
  the determining module 23 is configured to determine whether the current video frame is a scene switching frame according to the pre-encoded frame and a target pre-encoded frame in a case that there is no I frame in M encoded frames before the current video frame, the scene switching frame being a video frame in which scene switching has occurred relative to a previous video frame, the target pre-encoded frame being obtained by pre-encoding the previous video frame of the current video frame, the encoded frames being obtained by encoding video frames before the current video frame, and M being a preset positive integer;
  the second encoding module 24 is configured to encode the current video frame into an I frame in a case that the current video frame is the scene switching frame, and encode the current video frame into a P frame in a case that the current video frame is not the scene switching frame, to obtain an encoded frame of the current video frame; and
  obtain a bit stream according to the encoded frame of a current video frame and a plurality of encoded frames before the current video frame; and
  the transmitting module 25 is configured to transmit the bit stream to a client, so that the client displays a video screen according to the bit stream.

In some embodiments, each video frame in a plurality of video frames includes an image composed of a virtual game picture.

In some embodiments, the second encoding module 24 is further configured to: in a case that there is an I frame in the M encoded frames before the current video frame, encode the current video frame into a P frame, or encode the current video frame according to a secondary encoding mode and a preset encoding mode.

The apparatus embodiments and the method embodiments may correspond to each other, and for similar descriptions, reference may be made to the method embodiments, which are not repeated herein in order to avoid repetition. Specifically, the encoding apparatus shown in FIG. 9 may perform the method embodiment corresponding to FIG. 5, and the foregoing and other operations and/or functions of the modules in the encoding apparatus are separately intended to implement corresponding processes in the method embodiment corresponding to FIG. 5, which are not repeated herein for conciseness.

The encoding apparatus in some embodiments is described from a perspective of functional modules with reference to the accompanying drawings. The functional module may be implemented in a form of hardware, or may be implemented by instructions in a form of software, or may be implemented by a combination of hardware and software modules. Specifically, the steps of the method embodiments in the embodiments of this application may be completed by instructions in a form of an integrated logic circuit and/or software of hardware in a processor. The steps in the methods disclosed with reference to the embodiments of this application may be directly performed and completed by a hardware encoding processor, or may be performed and completed by using a combination of hardware and software modules in the encoding processor. In some embodiments, the software module may be located in a mature storage medium in the art, such as a random access memory, a flash memory, a read-only memory, a programmable read-only memory, an electrically erasable programmable memory, and a register. The storage medium is located in the memory, and a processor reads information in the memory and completes the steps in the foregoing method embodiments in combination with hardware of the processor.

Figure 10:
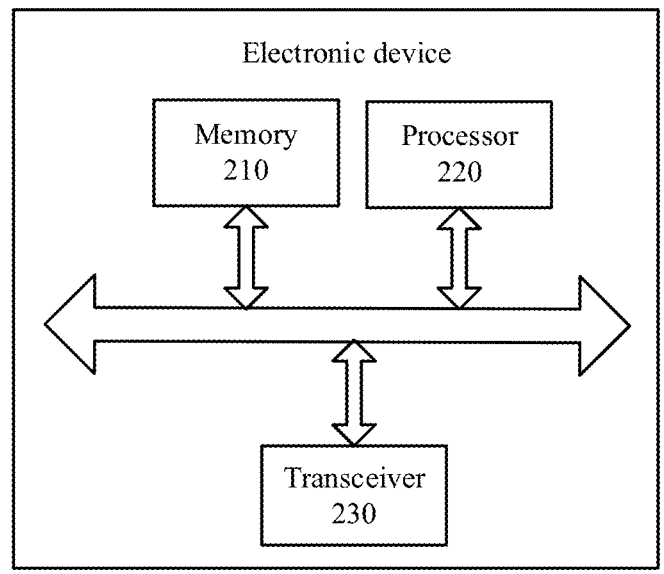
FIG. 10 is a schematic block diagram of an electronic device according to some embodiments.

FIG. 10 is a schematic block diagram of an electronic device according to some embodiments. The electronic device may be the server in the foregoing method embodiments.

As shown in FIG. 10, the electronic device may include: a memory 210 and a processor 220. The memory 210 is configured to store computer-readable instructions, and code of the readable instructions is transmitted to the processor 220. In other words, the processor 220 may call and run the computer-readable instructions from the memory 210, to implement the method in the embodiments of this application.

For example, the processor 220 may be configured to perform the foregoing method embodiments according to the instructions in the computer-readable instructions.

In some embodiments of this application, the processor 220 may include, but is not limited to:

- a general-purpose processor, a digital signal processor (DSP), an application specific integrated circuit (ASIC), a field-programmable gate array (FPGA), or other programmable logic devices, discrete gate or transistor logic devices, and discrete hardware components, or the like.

In some embodiments of this application, the memory 210 includes, but is not limited to:

- a volatile memory and/or a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM) or a flash memory. The volatile memory may be a random access memory (RAM), which is used as an external cache. Through illustrative and not restrictive description, RAMs in many forms can be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In some embodiments of this application, the computer-readable instructions may be divided into one or more modules, and the one or more modules are stored in the memory 210 and executed by the processor 220 to implement the method provided in this application. The one or more modules may be a series of computer-readable instruction segments capable of completing specific functions, and the instruction segments are used to describe an execution process of the computer-readable instruction in the electronic device.

As shown in FIG. 10, the electronic device may further include a transceiver 230. The transceiver 230 may be connected to the processor 220 or the memory 210.

The processor 220 may control the transceiver 230 to be communicated with other devices, specifically, may transmit information or data to the other devices, or receive the information or data transmitted by the other devices. The transceiver 230 may include a transmitter and a receiver. The transceiver 230 may further include antennas, and there may be one or more antennas.

Various components in the electronic device are connected by a bus system. In addition to a data bus, the bus system further includes a power supply bus, a control bus, and a state signal bus.

This application further provides a computer storage medium on which computer-readable instructions are stored, the computer-readable instructions, when executed by a computer, causing the computer to perform the method in the foregoing method embodiments. In other words, some embodiments further provide a computer program product including instructions, the instructions, when executed by a computer, causing the computer to perform the method in the foregoing method embodiments.

In a case that software is used to implement the embodiments, the embodiments may be implemented completely or partially in a form of a computer program product. The computer program product includes one or more computer-readable instructions. In a case that the computer-readable instructions are loaded and executed on a computer, processes or functions according to the embodiments of this application are generated in whole or in part. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the exemplary modules and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, may be located in one position, or may be distributed on a plurality of network modules. Some or all of the modules may be selected according to actual needs to achieve the objectives of the solutions of the disclosure. In addition, functional modules in the embodiments of in this application may be integrated into one processing module, or each of the modules may exist alone physically, or two or more modules are integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the appended claims.

What is claimed is:

1. An encoding method, performed by a server, comprising:
   pre-encoding a current video frame in a video stream, to obtain a pre-encoded current video frame;
   when there is no I frame in M encoded video frames that have been encoded before the current video frame, determining whether the current video frame is a scene switching frame in which scene switching has occurred relative to a previous video frame, based on the pre-encoded current video frame and a pre-encoded previous video frame to the current video frame, M being a preset positive integer; and
   encoding the current video frame into an I frame when the current video frame is the scene switching frame, and encoding the current video frame into a P frame when the current video frame is not the scene switching frame.

2. The encoding method according to claim 1, further comprising:
   encoding the current video frame into a P frame when there is an I frame in the M encoded video frames.

3. The encoding method according to claim 1, further comprising:
   encoding the current video frame based on a secondary encoding mode and a preset encoding mode when there is an I frame in the M encoded video frames.

4. The encoding method according to claim 3, wherein the preset encoding mode is a constant quantization parameter (CQP) mode, and the pre-encoding is CQP encoding.

5. The encoding method according to claim 3, wherein the secondary encoding mode comprises:
   starting from the first video frame, encoding of the I frame based on a preset cycle, and encoding a video frame following the I frame into the P frame.

6. The encoding method according to claim 1, wherein pre-encoding the current video frame comprises:
   downsampling the current video frame according to a preset sampling size, to obtain a downsampled video frame; and
   pre-encoding the downsampled video frame to obtain the pre-encoded frame.

7. The encoding method according to claim 1, wherein when there is no I frame in the M encoded video frames, the encoding method further comprises:
   counting a number of encoded video frames before the current video frame; and
   determining whether there is an I frame in the M encoded frames before the current video frame when the number of encoded frames before the current video frame is M.

8. The encoding method according to claim 1, wherein M is 128.

9. The encoding method according to claim 1, wherein the whether the current video frame is the scene switching frame is determined based on an amount of data in the pre-encoded current video frame and an amount of data in the pre-encoded previous video frame.

10. The encoding method according to claim 9, wherein the amount of data in the pre-encoded current video frame is a number of bytes of the pre-encoded current video frame and the amount of data in the pre-encoded previous video frame is a number of bytes of the pre-encoded previous video frame.

11. An encoding apparatus, comprising:
    at least one memory configured to store computer program code; and
    at least one processor configured to operate as instructed by the computer program code, the computer program code comprising:
    pre-encoding code configured to cause the at least one processor to pre-encode a current video frame in a video stream to obtain a pre-encoded current video frame;
    determining code configured to cause the at least one processor to determine, when there is no I frame in M encoded video frames that have been encoded before the current video frame, whether the current video frame is a scene switching frame in which scene switching has occurred relative to a previous video frame, based on the pre-encoded current video frame and a pre-encoded previous video frame to the current video frame, M being a preset positive integer; and
    encoding code configured to cause the at least one processor to encode the current video frame into an I frame when the current video frame is the scene switching frame, and encode the current video frame into a P frame when the current video frame is not the scene switching frame.

12. The encoding apparatus according to claim 11, wherein the encoding code is further configured to cause the at least one processor to:
    encode the current video frame into a P frame when there is an I frame in the M encoded video frames.

13. The encoding apparatus according to claim 11, wherein the encoding code is further configured to cause the at least one processor to:
    encode the current video frame based on a secondary encoding mode and a preset encoding mode when there is an I frame in the M encoded video frames.

14. The encoding apparatus according to claim 3, wherein the preset encoding mode is a constant quantization parameter (CQP) mode, and the pre-encoding is CQP encoding.

15. The apparatus according to claim 3, wherein the secondary encoding mode comprises:
    starting from the first video frame, encoding of the I frame based on a preset cycle, and encoding a video frame following the I frame into the P frame.

16. The encoding apparatus according to claim 11, wherein the pre-encoding code is further configured to cause the at least one processor to:
    downsample the current video frame according to a preset sampling size, to obtain a downsampled video frame; and
    pre-encode the downsampled video frame to obtain the pre-encoded frame.

17. The encoding apparatus according to claim 11, wherein the determining code is further configured to cause the at least one processor to:
    count a number of encoded video frames; and
    determine whether there is an I frame in the M encoded frames before the current video frame when the number of encoded frames before the current video frame is M.

18. The encoding apparatus according to claim 11, wherein the whether the current video frame is the scene switching frame is determined based on an amount of data in the pre-encoded current video frame and an amount of data in the pre-encoded previous video frame.

19. The encoding apparatus according to claim 18, wherein the amount of data in the pre-encoded current video frame is a number of bytes of the pre-encoded current video frame and the amount of data in the pre-encoded previous video frame is a number of bytes of the pre-encoded previous video frame.

20. A non-transitory computer readable medium having stored thereon a computer program for encoding, the computer program configured to cause one or more computer processors to:
   pre-encode a current video frame in a video stream, to obtain a pre-encoded current video frame;
   when there is no I frame in M encoded video frames that have been encoded before the current video frame, determine whether the current video frame is a scene switching frame in which scene switching has occurred relative to a previous video frame, based on the pre-encoded current video frame and a pre-encoded previous video frame to the current video frame, M being a preset positive integer; and
   encode the current video frame into an I frame when the current video frame is the scene switching frame, and encode the current video frame into a P frame when the current video frame is not the scene switching frame.

* * * * *